May 26, 1942.   R. BIRMANN   2,284,362
REVERSIBLE DRIVE
Filed March 30, 1938
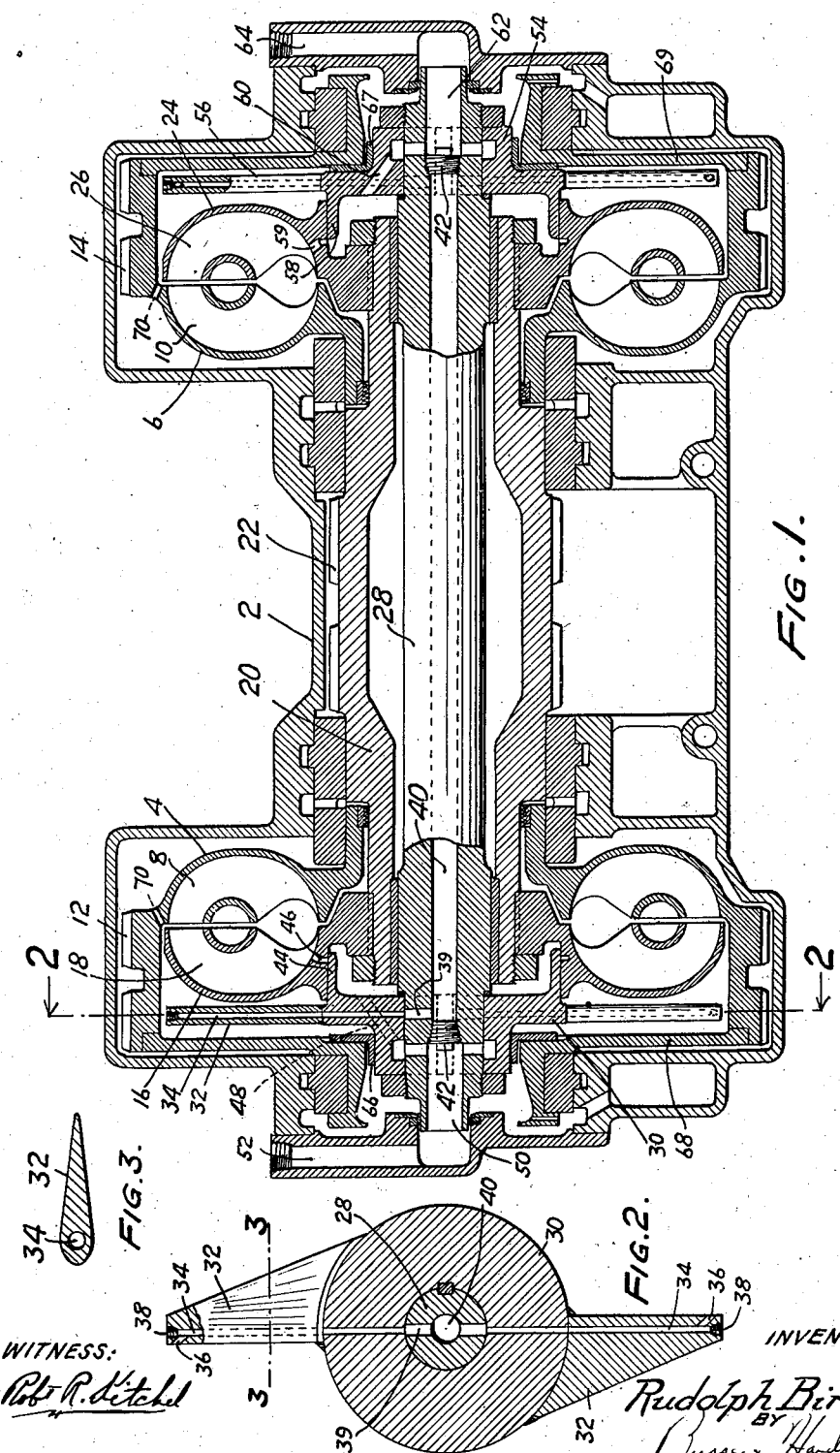
WITNESS:
INVENTOR
Rudolph Birmann
BY
ATTORNEYS.

Patented May 26, 1942

2,284,362

UNITED STATES PATENT OFFICE 2,284,362

REVERSIBLE DRIVE

Rudolph Birmann, Newton, Pa., assignor to De Laval Steam Turbine Company, Trenton, N. J., a corporation of New Jersey Application March 30, 1938, Serial No. 198,873

3 Claims. (Cl. 60—54)

This invention relates to a reversible driving mechanism specifically of the type involving the use of hydraulic couplings.

The type of hydraulic coupling disclosed in Föttinger Patent 1,199,359, dated September 26, 1916 is particularly useful for transmitting power where it is desirable to provide for some possibility of slippage and cushioning and the variable transmission of power, since it is a characteristic of this type of coupling that the slip between the driving and driven parts depends upon the load, and may be additionally controlled by the extent to which the coupling is filled with liquid, this latter, in view of the continuous leakage depending upon the amount of liquid supplied to the coupling. In an arrangement in which a reversible drive is to be transmitted without gear change such hydraulic couplings may be used in pairs adapted to selectively connect various elements for forward or reverse drive. Inasmuch as during either forward or reverse drive the coupling which is idle has its parts rotating in opposite directions, such couplings must be completely freed of the operating liquid, since otherwise considerable waste of power will result by dissipation in liquid friction. Furthermore, any residual liquid exerts a substantial drag between the parts rotating in opposite directions preventing the drive from coming up rapidly to a full speed condition.

It is the object of the present invention to provide a reversible drive mechanism incorporating the use of a pair of hydraulic couplings, which may be of the Föttinger type or of any other suitable type, in which the idle coupling, after a reversal takes place, is substantially immediately emptied, and by being emptied serves to more rapidly fill with driving liquid the coupling which has become active.

The above mentioned object, as well as subsidiary objects, particularly relating to details of execution of the invention, will become apparent from the following description read in conjunction with the accompanying drawing, in which:

Figure 1 is a vertical section taken through the improved transmission unit;

Figure 2 is a vertical section taken through the liquid removing means on the plane indicated at 2—2 in Figure 1; and Figure 3 is a transverse section taken on the plane indicated at 3—3 in Figure 2.

The improved transmission comprises a housing 2 provided with suitable bearings, which will be evident from the drawing, and arranged to enclose the mechanism against leakage of the driving and lubricating liquid. Journalled symmetrically in the housing 2 are elements 4 and 6 constituting the driving elements of two hydraulic couplings which may be of the Föttinger type, indicated above, though it will be understood that the invention is applicable to other types of hydraulic couplings which, for their operation, depend upon the introduction of liquid. The coupling elements 4 and 6 are provided with the impeller passages, conventionally illustrated at 8 and 10, and are provided with gear teeth, indicated at 12 and 14, through which they are continuously driven in opposite directions by means not shown from a prime mover. For simplicity of description, let it be assumed that the gear 12 is rotating such that its upper portion is moving away from the observer, and that gear 14 is rotating in the opposite direction, namely, with its upper end moving in the direction of the observer. Cooperating with the impeller member 4 of the first coupling, there is a driven turbine or runner member 16 provided with liquid passages conventionally illustrated at 18. This runner member is secured to a hollow pinion 20 journalled in the housing and provided with teeth 22 designed to transmit power to the driven device. The turbine or runner member 24 associated with the second coupling is provided with passages 26, and, like the member 16, is secured to the pinion 20. Thus, the driven elements of the couplings are constrained to rotate in the same direction, and their common direction will depend upon which coupling is filled with the driving liquid.

Extending through the hollow pinion 20 and arranged to rotate and axially slide relative thereto, is a shaft 28 which carries at one end an annular element 30 which is provided with streamlined extensions 32 bored as indicated at 34 and provided with outer lateral passages 36 communicating with the bores 34 which are closed at their outer ends by plugs 38. The bores 34 communicate through openings 39 with the central bore 40 of the shaft 28, which bore is closed at both ends by screw plugs 42.

The annular element 30 is provided with a flange 44 adapted to act as a valve to open or close a passage 46 communicating with the liquid receiving portion of the adjacent coupling and serving to connect it, when the member 44 is in its open position, through a passage 48 with the opening 50 at the left hand end of the shaft 28, which in turn is in communication with the passage 52 in the casing through which the coupling driving liquid may be introduced.

At the opposite end of the shaft there is provided an element 54, similar to 30, also provided with streamlined extensions 56, containing passages as described previously. This element 54 also carries a valve flange 58 serving to control flow of driving liquid to the second coupling through the connecting passage 60, the opening 62 and the passage 64 in the housing.

Assuming directions of rotation as indicated above, the passages 36 of the left hand element 30 open opposite the direction of rotation of the impeller element 4 of that coupling. The same relation exists at the right hand end of the apparatus in which the corresponding openings open opposite the direction of rotation of the impeller member 6.

An annular friction disc 66 is provided between the element 30 and the disc 68 forming part of the impeller and gear structure 4, 12, and a similar disc 67 is provided between element 54 and the disc 69, for the purposes hereafter mentioned.

The forward or reverse condition of the driving mechanism is determined by the selective introduction of driving fluid into the passage 52 or 64. Assuming that the driving fluid is introduced through the passage 64, the parts will be in the condition illustrated, and the right hand coupling will be active. The liquid passes from 64 into 62, thence through the passages 60 and passages 59 into the coupling, filling the same, while the liquid which leaks from between the coupling elements fills the space within the gear 14 and escapes through openings 70 into the surrounding housing from which it is recirculated, with cooling, by the liquid supply pump. At this time liquid is not supplied to the passage 52, and it will be noted that communication between 52 and the interior of the left hand coupling is interrupted by reason of the fact that the sleeve member 44 closes the passages 46, this condition as well as the open condition of the passage 59 being achieved because of the right hand position of the shaft 28 within the hollow pinion 20. The left hand coupling will, therefore, be drained through the passage 70 and cannot receive any liquid which may remain in the connections from passage 52. The result of this condition is that the pinion 22 will be driven in the direction of rotation of the gear 14.

The pressure of liquid at the left of element 54, forces it to the right against friction disc 67 so that both elements 30 and 54 and shaft 28 rotate as a unit with gear 14. This means that shaft 28 will have a differential movement with respect to pinion 20 due to the slip of the coupling.

When it is desired to reverse the direction of rotation, the supply of liquid through the passage 64 is interrupted and driving liquid is introduced through the passage 52. The introduction of liquid under pressure into passage 52 and the removal of pressure at 64 results in the exertion of pressure at the right hand side of the element 30 through the passages 50 and 48, with the result that the shaft 28 is moved to the left, uncovering the passages 46 and simultaneously effecting the closure of the passages 59 by the sleeve 58, so that any residual liquid in the feeding passages for the right hand coupling is immediately cut off from the interior of the coupling to accelerate emptying thereof. Liquid now flows through the passages 46 into the left hand coupling. Simultaneously with this action, inasmuch as the right hand coupling is no longer receiving liquid, its liquid will escape through its leakage passage 70, entering the housing and returning to the liquid supply, but will also enter the space within the gear 14. The element 30 will now be rotating with the gear 12, opposite its previous direction, due to the friction disc 66, and the element 54, therefore, will also be rotating in the opposite direction, that is, opposite the direction of rotation of gear 14, scooping liquid from within this gear, due to the Pitot tube action of its openings 36, and will deliver the liquid to within the gear 12. It will be noted that the relative angular velocity of the element 54 and the liquid rotating within and with the gear 14 is double that of the gear 14 giving rise to a very considerable pressure causing flow to the left hand coupling. This pressure serves to build up a back pressure in gear 12 to fill the left hand coupling from its periphery. Thus both emptying of the right hand coupling and filling of the left hand coupling are greatly accelerated with resulting increase in the rapidity of reversal, the reversal being accomplished in a smooth fashion in view of the characteristics of the couplings, the slips of which increase as the amount of liquid therein decreases.

The transfer of liquid from one coupling to the other by means of the members 30 and 54 is very important, since as much as 90% of the liquid required to fill an empty coupling is obtained by this transfer from the other coupling. The rapidity of emptying and filling is tremendously increased, and it becomes unnecessary to provide an oil supply pump of greater capacity than is needed to keep one or the other coupling filled during unidirectional operation when the oil supply has to be merely sufficient to take care of the spilling through holes 70, which spilling is provided in order to hold down the temperature of the oil. If the oil pump would have to be made large enough to take care of completely filling and emptying the coupling member in a reasonably short time it would have to be approximately ten times the size necessary for the present arrangement.

The fact that liquid is withdrawn from one coupling and used to fill the other definitely prevents both couplings from being empty at the same time, thereby avoiding release of torque from a driving turbine or motor, so that the turbine or motor cannot run away.

It will be clear that numerous variations may be made in the embodiment of the invention without departing from its scope as defined by the following claims.

What I claim and desire to protect by Letters Patent is:

1. A reversible driving mechanism comprising a driven member, a pair of hydraulic couplings having driving impeller elements and driven turbine elements, means for the selective introduction of driving liquid to the two couplings, the driven elements of both couplings being connected to said driven member whereby the latter may be selectively driven by either, the driving elements rotating continuously to effect opposite rotations of the driven member when the couplings are selectively filled with liquid, and means for transferring liquid directly from one of said couplings which is being rendered inoperative to the coupling which is being rendered operative when a change in direction of drive is being effected, said direct transfer being in addition to the introduction of liquid by said selective liquid introducing means, and being effected through a path additional to the paths of flow involved in said selective introduction of driving liquid, said last named means including means for scooping liquid discharged from one coupling for transfer to the other.

2. A reversible driving mechanism comprising a driven member, a pair of hydraulic couplings having driving impeller elements and driven turbine elements, means for the selective introduction of driving liquid to the two couplings, the driven elements of both couplings being connected to said driven member whereby the latter may be selectively driven by either, the driving elements rotating continuously to effect opposite rotations of the driven member when the couplings are selectively filled with liquid, and scooping means rotating, when a reversal of drive is initiated, in a direction opposite the direction of rotation of the driving element of the coupling being rendered inoperative for scooping liquid discharged from said coupling and for transferring it directly to the other coupling when a change in direction of drive is being effected, said direct transfer being in addition to the introduction of liquid by said selective liquid introducing means.

3. A reversible driving mechanism comprising a driven member, a pair of hydraulic couplings having driving impeller elements and driven turbine elements, means for the selective introduction of driving liquid to the two couplings, the driven elements of both couplings being connected to said driven member whereby the latter may be selectively driven by either, the driving elements rotating continuously to effect opposite rotations of the driven member when the couplings are selectively filled with liquid, and means for transferring liquid directly from one of said couplings which is being rendered inoperative to the coupling which is being rendered operative when a change in direction of drive is being effected, said direct transfer being in addition to the introduction of liquid by said selective liquid introducing means, said last named means including means for scooping liquid discharged from one coupling for transfer to the other, said scooping means being hydraulically controlled by the selective introduction of driving liquid to the couplings and selectively oppositely driven by the driving elements of the couplings.

RUDOLPH BIRMANN.

CERTIFICATE OF CORRECTION.

Patent No. 2,284,362.                                            May 26, 1942.

RUDOLPH BIRMANN

It is hereby certified that error appears in the above numbered patent requiring correction as follows: In the grant, line 1, and in the heading to the printed specification, line 3, residence of inventor, for "Newton" read --Newtown--; and that the said Letters Patent should be read with this correction therein that the same may conform to the record of the case in the Patent Office.

Signed and sealed this 28th day of July, A. D. 1942.

(Seal)

Henry Van Arsdale,
Acting Commissioner of Patents.